April 22, 1969 G. P. HOUCKE 3,440,547
SYNCHRONIZER FOR MODIFYING THE ADVANCE OF TIMING WAVE COUNTDOWN CIRCUITS
Filed April 11, 1966
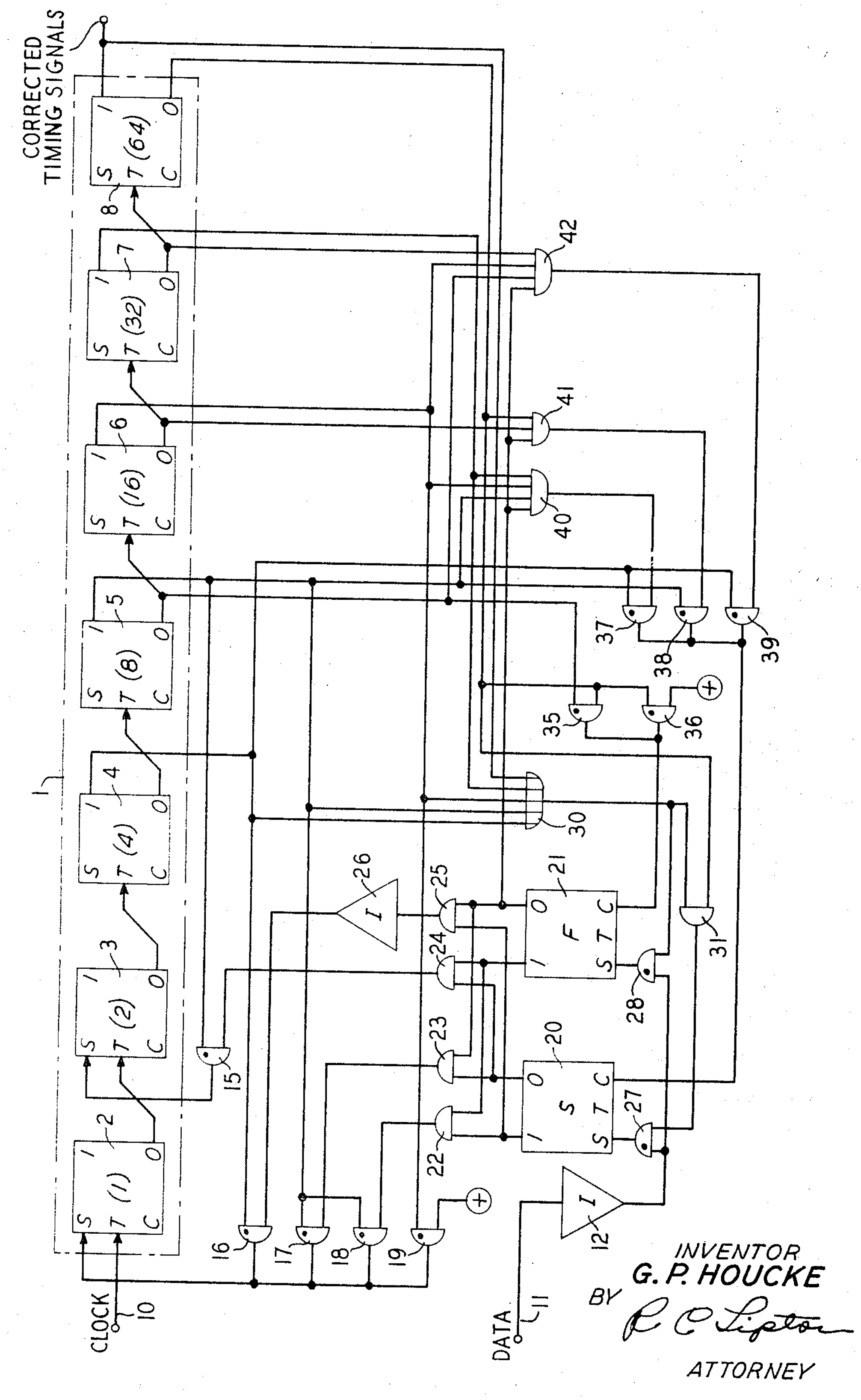
INVENTOR
G. P. HOUCKE
BY R C Lipton
ATTORNEY United States Patent Office 3,440,547
Patented Apr. 22, 1969

3,440,547

SYNCHRONIZER FOR MODIFYING THE ADVANCE OF TIMING WAVE COUNTDOWN CIRCUITS

George P. Houcke, Tenafly, N.J., assignor to Bell Telephone Laboratories, Incorporated, New York, N.Y., a corporation of New York Filed Apr. 11, 1966, Ser. No. 541,707
Int. Cl. H03k 3/04, 1/00
U.S. Cl. 328—63 12 Claims

ABSTRACT OF THE DISCLOSURE

A clock driven seven-stage binary counter is phase-locked to incoming data signals by feedback gates pulsed by various counter stages to advance the count. Some of the gates are normally enabled to cycle the counter in response to 100 clock pulses instead of 128. Disabling any normally enabled gate, therefore, retards the phase of the counter while enabling other ones of the gates advances the phase of the counter. Control of the gates is provided by flip-flops which register which portion of the counter cycle coincides with the incoming data signal transition.

This invention relates to frequency control circuits for synchronous data receivers and, more particularly, to the recovery of timing signals by clock circuits phase-locked to incoming data signals.

It is a broad object of this invention to synchronize a receiver clock oscillator with incoming data signals.

The utilization of a local clock in a synchronous data receiver to provide timing signals for the detection of received data is disclosed in Patent No. 3,209,265 which issued on Sept. 28, 1965, to Paul A. Baker and Mason A. Logan. The clock includes an oscillator driving a frequency dividing countdown chain providing timing signals at the output thereof having a frequency corresponding to the signaling frequency of the received data signals. The phase of the timing signals and the crossovers or transitions of the incoming signals are compared and if the incoming signals are occurring before or after the timing wave transitions, and "add" or "delete" correction signal is applied to the countdown circuit to advance or retard the timing wave signal an incremental phase interval. Thus the clock oscillator is phase-locked to the incoming data signals.

The arrangement disclosed in the patent of P. A. Baker et al., contemplates the application of a continuous stream of synchronous data bits to the receiver. Synchronization can thus be achieved over a long period of time permitting incremental adjustment of the clock phase for each correction. However, in systems wherein data communication may comprise short messages or data receivers are connected to the communication line for short intervals rapid synchronization is desirable.

Accordingly, it is an object of this invention to rapidly synchronize a phase-locked clock oscillator.

One difficulty that is encountered when a clock phase is rapidly corrected is jitter of the output timing wave due to the final course adjustment and the resultant hunting of the circuit to achieve proper synchronization.

It is another object of this invention to preclude jitter of the output timing wave.

It is a feature of this invention that a plurality of adjustment circuits are provided to advance the countdown circuit a plurality of increments each countdown cycle. The application of a correction signal therefore results in a multiple increment advance to rapidly synchronize the clock oscillator.

It is another feature of this invention that variable increments of phase adjustment are provided in accordance with the phase difference between the timing wave and the incoming data signals. When the phase difference is large, a multiple increment adjustment of the count is made whereas when the difference is minimum the adjustment is reduced to a single increment. The effect is to produce rapid synchronism for large phase differences and fine adjustment to preclude jitter when the phase difference is small.

The foregoing and other objects and features of this invention will be fully understood from the following description of an illustrative embodiment thereof taken in conjunction with the accompanying drawing where in the single figure thereof there is disclosed in schematic form a phase-lock circuit for adjusting the timing wave output of a clock oscillator in accordance with this invention.

Before describing the illustrative embodiment of the invention, a brief description of the types of logic circuits and elements utilized therein will be given. Referring to the drawing, the circuits therein are shown utilizing positive logic. Each flip-flop such as flip-flop 2, for example, is provided with three input terminals and two output terminals. Input terminal S places the flip-flop in the SET condition when a positive going transition is applied thereto and in the SET condition the "1" or set output terminal is driven to the positive condition. When a positive transition is applied to clear input terminal C, the flip-flop is driven to the CLEAR condition and the "0" or clear output terminal goes to the positive condition. Input terminal T comprises the toggle input and when a positive transition is applied thereto, the flip-flop is driven from one condition to the other.

The circuit includes a plurality of AND gates such as AND gate 40. Each AND gate includes a plurality of inputs and is arranged to provide a positive output when all of the inputs are in the positive condition. Another circuit included therein is an OR gate such as OR gate 30. OR gate 30 is arranged to provide a positive output thereof when any one of the plurality of inputs goes to the positive condition. Also shown in the figure are pulsing gates such as gate 15. Gate 15 includes two input terminals, one of the input terminals being adjacent to a dot as shown in the drawing and hereinafter designated as the input pulsing lead. When the other input terminal has a positive condition applied thereto, the pulsing gate is enabled and passes a positive transition from the input pulsing lead to the output thereof. It is noted that conventional pulsing gates include capacitors which inherently delay the signals applied to the enabling lead. Thus, when a positive enabling signal is removed concurrently with the application of a pulse to the pulsing lead, the gate is maintained enabled for a sufficient interval to pass the pulse.

The circuit includes input data lead 11 which has applied thereto from the data receiver, not shown, the incoming data signals. Clock pulses are applied to clock lead 10, the frequency of the clock pulses being 100 times the data signaling speed, that is, 100 clock pulses are applied to clock lead 10 for each ideal data signal element duration.

Clock lead 10 extends to the input of a binary counter generally indicated by block 1. Binary counter 1 includes seven binary flip-flop stages designated stages 2 through 8 with clock lead 10 extending to the toggle input of flip-flop stage 2 and the "0" or clear output terminal of each flip-flop stage extending to the toggle input of the next subsequent flip-flop stage. The circuit is thus arranged as a binary counter as is well known in the art which normally provides a binary count of 128. Accordingly, assuming no other control over the binary counter, all of the flip-flop stages are in the CLEAR condition intially designated the ZERO count, flip-flop stage 8 is SET upon the application of 64 pulses and after the application thereto of 127 pulses, all of the stages are in the SET condition designating a count of 127.

The binary counter is arranged to SET flip-flop 8 after 50 clock pulses and to provide a complete cycle in response to 100 clock pulses instead of the conventional 128 through the utilization of feedback gates 16, 17 and 19 as described hereinafter. Since the counter cycles in response to 100 clock pulses, the clock cycle duration is the same as the ideal data signal element duration. Accordingly, if the initiation of each clock cycle occurs concurrently with the transition of the data elements then the midpoint of the counter cycle, upon the application thereto of 50 clock pulses, occurs at the theoretical midpoint of the data element. At this time flip-flop 8 is SET as stated above driving the set output thereof to a positive condition and the clear output to a negative condition. These transitions occurring at the midpoint of the data element are utilized as a timing signal pulse for examining the incoming data elements. It is apparent that the counter cycle must be maintained in synchronism with the incoming data signals in order that the timing signal pulses occur at the data element midpoints. Accordingly, this invention provides means for advancing or retarding the timing signal pulses by modifying the number of clock pulses required for the counter cycle when the incoming signal transitions do not occur at substantially the same time as the initiation of the counter cycles. In addition to gates 16, 17 and 19, feedback gates 15 and 18, said gates forming a modifying means, are provided to modify the number of clock pulses required to drive binary counter 1 through its cycle.

In general, the feedback gates are controlled by S flip-flop 20 and F flip-flop 21 and the flip-flops, constituting a registering means, in turn, are jointly controlled by the incoming data transitions by way of gates 27 and 28 and by the advance of counter 1 via gates 30, 31 and 35 through 42. When an incoming transition occurs at substantially the same time as the initiation of a counter cycle, the normal states of flip-flops 20 and 21 are preserved maintaining the normal conditions of feedback gates 15 through 19 whereby counter 1 is driven through a complete cycle in response to 100 clock pulses. In the event that an incoming transition does not occur at the same time as the initiation of a counter cycle, the states of either or both flip-flops 20 and 21 are switched, in accordance with the concurrent count of binary counter 1, and the states of flip-flop 20 and 21 are restored as counter 1 advances through the remaining portion of the cycle. The change in the states of flip-flops 20 and 21 changes the conditions of the feedback gates which, in turn, modify the counter cycle by advancing or retarding the count. In addition, since the restoration of flip-flops 20 and 21 are controlled by the advance of binary counter 1 through the remainder of the cycle, subsequent modifications of the counter cycle are effected in accordance with the phase difference between the initiation or termination of the counter cycle and the instant in the counter cycle when the data transition is received. Accordingly, the counter cycle is modied to a variable degree in accordance with the phase difference between the incoming signals and the counter output.

Returning now to the feedback gates, a positive potential is applied to the enabling lead of gate 19 whereby the gate is always maintained in an enabled condition. In the normal condition, gates 16 and 17 are also enabled and gates 15 and 18 are disabled as described hereinafter. Under this condition, the binary counter is driven through a full cycle in response to 100 clock pulses as described below.

With binary counter 1 in its initial condition, the first clock pulse from clock pulse lead 10 SETS flip-flop 2 advancing binary counter 1 to the count of 1. The next clock pulse applied to the toggle input of clock flip-flop 2 CLEARS the flip-flop. As a result thereof, the "0" output terminal of flip-flop 2 goes positive and the positive transition is applied to the toggle input of flip-flop 3 whereby the flip-flop is SET. Upon the application of the next clock pulse to clock pulse lead 10, flip-flop 2 is again SET, driving binary counter 1 to the count of 3. When the fourth clock pulse is applied to the binary counter 1, flip-flop 2 is CLEARED, CLEARING in turn flip-flop 3. This provides a pulse to the toggle input of flip-flop 4, driving the flip-flop to the SET condition. As a consequence thereof, the "1" output terminal of flip-flop 4 is driven to the positive condition, and this positive transition is passed through gate 16 which, as previously described, is enabled and then to the set input of flip-flop 2. Accordingly, flip-flop 2 is SET and since flip-flop 4 was previously SET, the binary counter is driven to the count of 5 although only 4 clock pulses have been applied thereto. Similarly, each time flip-flop 4 is SET, the positive transition is passed through gate 16 to the set input of flip-flop 2. This occurs 16 times during the cycle of binary counter 1. Since the count of binary counter 1 is thus advanced 16 times during its cycle as a result of flip-flop 4 being SET, the total count is reduced by 16.

Continuing now with the application of clock pulses to clock pulse lead 10, when the fifth clock pulse is applied to the toggle input of flip-flop 2, it is restored to the CLEAR condition, SETTING flip-flop 3 and thus advancing binary counter 1 to the binary count of 6. Continuing, the sixth clock pulse advances binary counter 1 to the binary count of 7 and the seventh clock pulse advances binary counter 1 to the binary count of 8. This binary count, that is, the binary count of 8 is derived from the CLEARING of flip-flops 2, 3 and 4 and the SETTING of flip-flop 5. When flip-flop 5 is SET, a positive transition is applied to the "1" output terminal thereof. This positive transition is passed to the pulsing input lead of gate 17 and since gate 17 is enabled, a positive transition is applied therethrough to the set input of flip-flop 2. Accordingly, the count of binary counter 1 is advanced to the count of 9 although only 7 clock pulses have been applied thereto. Similarly, each time flip-flop 5 is SET, a positive transition is applied by way of gate 17 to the set input of flip-flop 2. Since this occurs eight times during the cycling of binary counter 1, the consequent advances of the binary count reduces the number of clock pulses required to cycle binary counter 1 by eight.

Continuing with the application of clock pulses to clock pulse lead 10, when binary counter 1 is driven to the binary count of 16, flip-flop 6 is driven to the SET condition as is well known in the art. As a consequence thereof, the "1" output terminal of flip-flop 6 is driven positive and the positive transition is passed through gate 19 to the set input of flip-flop 2, thus advancing the binary count by a count of 1. Since this occurs four times during the cycle of binary counter 1, the total count for each cycle is thus reduced by four. Summing up the above described reductions in count, namely, 16, 8 and 4, it is seen that the total reductions in count amounts to 28. Accordingly, the total number of clock pulses normally required to cycle binary counter 1 equals 128 pulses less 28 or a total of 100 pulses.

The conditions of gates 15 through 18 are controlled by S flip-flop 20 and F flip-flop 21 which flip-flops apply their outputs to gates 15 through 18 by way of gates 22 through 25 and inverter 26. Initially S flip-flop 20 and F flip-flop 21 are in the CLEARED condition. Since the "0" output terminals of both flip-flops extend to the inputs of AND gate 23, the gate develops a positive condition at the output thereof which condition is passed to the enabling input of pulser gate 17. Accordingly, pulser gate 17 is normally maintained in an enabled condition. With flip-flops 20 and 21 in the CLEARED condition, AND gates 22, 24 and 25 do not provide positive conditions at the outputs thereof. Since the outputs of gates 22 and 24 are connected to the enabling leads of pulser gates 18 and 15, respectively, these pulser gates are maintained disabled. The output of AND gate 25 extends to inverter 26. Accordingly, the low condition output of gate 25 is converted to a high condition by inverter 26 which high condition is applied to the enabling lead of pulser gate 16. Thus, with a high condition applied to the enabling lead of pulser gate 19, gates 16, 17 and 19 are normally enabled whereby binary counter 1 requires 100 clock pulses to drive it through a full cycle as previously described.

S flip-flop 20 and F flip-flop 21 are controlled jointly by the incoming data transitions and the advance of binary counter 1 as described hereinafter. Flip-flops 20 and 21 are driven into various combinations of states when incoming data transitions occur during intervals other than substantially the initiation of a counter cycle. Assuming now that as a result of a transition occurring at a time other than the initiation of a counter cycle flip-flops 20 and 21 are both SET in a manner described hereinafter, both "1" output terminals thereof go to the high condition driving to this high condition both input leads of AND gate 22. The output of AND gate 22 therefore goes high, which condition is applied to the enabling lead of pulser gate 18 whereby gate 18 is enabled. With both flip-flops 20 and 21 SET, the outputs of AND gates 23 through 25 are in the low condition thereby disabling pulser gates 15 and 17 and enabling pulser gate 16 by way of inverter 26. Accordingly, with flip-flops 20 and 21 SET, pulser gates 16, 18 and 19 are enabled and pulser gates 15 and 17 are disabled.

In the event that, due to an incoming data transition and the advance of counter 1, flip-flop 20 is SET and flip-flop 21 is CLEARED, the high conditions at the "1" output terminal of flip-flop 20 and the "0" output terminal of flip-flop 21 enable AND gate 25 to apply a high condition to inverter 26. Inverter 26 in turn applies a low condition to the enabling lead of pulser gate 16 thereby disabling the gate. At this time AND gates 22 through 24 provide low conditions at the outputs thereof. Accordingly, pulser gates 15, 17 and 18 are disabled. Thus, with S flip-flop 20 in the SET condition and F flip-flop 21 in the CLEAR condition, gates 15 through 18 are disabled and gate 19 is enabled.

Assuming now that flip-flop 20 is in the CLEAR condition and flip-flop 21 is in the SET condition, the high conditions provided at the "0" output terminal of flip-flop 20 and the "1" output terminal of flip-flop 21 are applied to AND gate 24. Accordingly, AND gate 24 applies a high condition to the enabling lead of pulser gate 15 whereby this latter gate is enabled. Concurrently therewith the outputs of AND gates 22, 23 and 25 go to the low condition, thereby enabling pulser gate 16 and disabling gates 17 and 18 as previously described. Accordingly, pulser gates 15, 16 and 19 are enabled and gates 17 and 18 are disabled.

The set input terminals of flip-flops 20 and 21 are connected to the outputs of pulser 27 and 28 respectively. The input pulser leads of gates 27 and 28 are in turn connected, in parallel, to inverter 12, and the input of inverter 12 extends to data input lead 11. When a mark to space transition is received on input data lead 11, the negative going transition is applied to inverter 12 and inverter 12 in turn applies a positive going transition to the input pulsing leads of gates 27 and 28. Accordingly, in the event that pulser gates 27 and 28 are enabled as described hereinafter, the reception of a mark to space transition provides a positive going transition to pulser gates 27 and 28 thereby SETTING S flip-flop 20 and F flip-flop 21.

The enabling input lead to pulser gate 28 extends to the output of OR gate 30. OR gate 30 has five input leads extending thereto. These five input leads are connected to the "1" output terminal of flip-flop 4, the "1" output terminal of flip-flop 5, the "1" output terminal of flip-flop 6, the "1" output terminal of flip-flop 7 and the "1" output terminal of flip-flop 8 of binary counter 1. As previously described, flip-flop 4 is SET upon binary counter 1 attaining a binary count of 4. With flip-flop 4 SET, the "1" output terminal thereof goes to the high condition which condition is applied to the input terminal of OR gate 30. Accordingly, OR gate 30 enables pulser gate 28 when binary counter 1 attains the count of 4. The high condition at the "1" output terminal of flip-flop 4 is maintained until a binary count of 8 is reached. At this time, however, flip-flop 5 is SET and the high condition at its "1" output terminal is applied to OR gate 30 thereby maintaining pulser gate 28 enabled. Similarly, through subsequent counts, flip-flops 6 through 8 are SET, and since at least one of flip-flops 4 through 8 is SET for the remainder of the cycle, pulser gate 28 is maintained enabled through the clock pulse counts of 4 through 100. Accordingly, in the event that a mark to space transition is received during clock pulse counts 4 through 100, pulser gate 28 SETS F flip-flop 21.

The enabling input to pulser gate 27 is connected to the output of AND gate 31. One input to AND gate 31 is extended to the output of OR gate 30. This input therefore is maintained in the high condition through clock counts 4 through 100. The other input to AND gate 31 extends to the "0" output terminal of flip-flop 8. Flip-flop 8 of course is maintained in the CLEAR condition through the first 64 binary counts which correspond to clock pulse counts 1 through 50. Accordingly, the "0" output terminal of flip-flop 8 is in the high condition through clock pulse counts 1 through 50 and both inputs to AND gate 31 are concurrently in the high condition through clock pulse counts 4 through 50. Accordingly, AND gate 31 enables pulser gate 27 during clock pulse counts 4 through 50 whereby in the event that a mark to space transition is received during this interval S flip-flop 20 will be SET.

Assuming now that a mark to space transition occurs in the interval between clock pulse 4 and clock pulse 13 indicating that the phase of the locally generated timing signal at the output of counter 1 leads the phase of the received data signal, S flip-flop 20 and F flip-flop 21 will be SET in response thereto as previously described. Accordingly, pulser gates 16, 18 and 19 are enabled and pulser gates 15 and 17 are disabled.

Upon the occurrence of the seventh clock pulse, binary counter 1 advances to the binary count of 8, SETTING flip-flop 5. A feedback pulse is thus provided from the "1" output terminal of flip-flop 5 to the input pulsing leads of gates 17 and 18. At this time gate 17 is disabled. Gate 18, however, is enabled, whereby the feedback pulse is passed therethrough to the set input of flip-flop 2. Accordingly, binary counter 1 is advanced 1 count in the same manner as previously described with respect to the normal cycling condition with the exception that the pulse is applied by way of gate 18 instead of gate 17. No change is therefore made in the total count per cycle at this time.

Upon the occurrence of the tenth clock pulse binary counter 1 advances to the twelfth binary count. At this count flip-flop 4 SETS, applying a pulse by way of gate 16 to the set input of flip-flop 1 as previously described. Accordingly, the counter is advanced in the same manner as during the normal 100 count cycle.

Upon the application of the thirteenth clock pulse, binary counter 1 advances to the sixteenth binary count, flip-flop 6 SETS and a feedback pulse passes by way of gate 19 to the set input of flip-flop 2, thus advancing the counter in the normal manner. Concurrently therewith, flip-flop 5 CLEARS, providing a positive going transition at the "0" output terminal thereof. This positive going transition is applied to the input pulsing lead of gate 35. The enabling lead of gate 35 is connected to the "0" output terminal of flip-flop 8. Since flip-flop 8 is CLEAR at this time, gate 35 is enabled and therefore passes the pulse from the "0" output terminal of flip-flop 5 to the CLEAR input of F flip-flop 21. Accordingly, F flip-flop 21 is CLEARED and with S flip-flop 20 SET, gates 15 through 18 are disabled as previously described.

Upon the application of the sixteenth clock pulse, binary counter 1 advances to the binary count of 20. Flip-flop 4 SETS at this time, applying a positive transition to gate 16. Gate 16, however, is disabled, precluding the application of a feedback pulse to flip-flop 1. Accordingly, the normal increase of the binary count at this time is precluded retarding the cycle 1 count.

The SETTING of flip-flop 4 also applies a positive transition from the "1" output terminal thereof to gate 39. The enabling lead of gate 39 extends to the output of AND gate 42. AND gate 42 is provided with an input terminal which extends to the "0" output terminal of F flip-flop 21. Since this flip-flop is now CLEARED, a positive condition is applied to gate 42. Another input terminal of AND gate 42 extends to the "0" output terminal of flip-flop 5. This flip-flop is now in the CLEARED condition applying a positive condition to AND gate 42. The final two input terminals of AND gate 42 extend to the "1" output terminal of flip-flop 6 and the "0" output terminal of flip-flop 7. Since flip-flop 6 is in the SET condition and flip-flop 7 is in the CLEAR condition both these flip-flops apply positive conditions to AND gate 42. Since all of the inputs to AND gate 42 are positive, pulser gate 39 is enabled, passing the positive transition derived from the "1" output terminals of flip-flop 4 to the CLEAR input of S flip-flop 20, thus CLEARing the latter flip-flop. Accordingly, flip-flops 20 and 21 are restored to their initial CLEAR states, restoring feedback gates 15 through 18 to their normal conditions. The cycle, however, has been retarded 1 count as previously described. Accordingly, 101 clock pulses are required to complete the count cycle. In this manner the output timing signal from counter 1 is delayed in order to bring it into closer synchronism with the received data signals.

In the event that a mark to space transition occurs between clock pulse 13 and clock pulse 24 indicating that the phase of the locally generated timing signal at the output of counter 1 leads the incoming data signal by a greater degree than described above, S flip-flop 20 and F flip-flop 21 will again be SET as previously described, enabling pulser gates 16, 18 and 19, and disabling pulser gates 15 and 17.

Upon the occurrence of the sixteenth clock pulse, binary counter 1 advances to the binary count of 20 SETTING flip-flop 4. The "1" output terminal of flip-flop 4 applies a positive transition through pulser gate 16 to the SET input of flip-flop 2, thus increasing the count in the normal manner.

Upon the occurrence of the nineteenth clock pulse, binary counter 1 advances to the binary count of 24 SETTING flip-flop 5. With pulser gate 18 enabled the feedback pulse from the "1" output terminal of flip-flop 5 is applied therethrough to the SET input of flip-flop 2, thereby increasing the count in the same manner as previously described with respect to the normal cycling condition with the exception that the pulse is applied by way of gate 18 instead of gate 17.

Upon the occurrence of the twenty-second clock pulse, binary counter 1 advances to the binary count of 28 SETTING flip-flop 4. Accordingly, a feedback pulse is applied through gate 16 in the previously described manner.

When the twenty-fifth clock pulse is applied to binary counter 1, advancing the counter to the binary count of 32, flip-flop 7 is SET and flip-flops 2 through 6 are CLEARED. At this time no feedback pulse is provided to any one of gates 15 through 19. The CLEARING of flip-flop 5, however, provides a positive transition at the "0" output terminal thereof which transition is applied to the pulsing lead of gate 35. Since the enabling lead of gate 35 is connected to the "0" output terminal of flip-flop 8, gate 35 is enabled as previously described, and the pulse provided by flip-flop 5 is passed therethrough to the CLEAR input of F flip-flop 21. Accordingly, with binary counter 1 attaining the binary count of 32, F flip-flop 21 is CLEARED, and with S flip-flop 20 SET gates 15 through 18 are disabled as previously described.

Upon the occurrence of the twenty-ninth clock pulse, binary counter 1 advances to the binary count of 36 SETTING flip-flop 4. Accordingly, a positive transition at the "1" output terminal of flip-flop 4 is applied to the pulsing lead of gate 16. Gate 16 is disabled at this time, however, since F flip-flop 21 is CLEAR and S flip-flop 20 is SET. The feedback pulse is thus blocked, precluding the normal increase in the binary count.

Upon the application of clock pulse 33, binary counter 1 advances to the binary count of 40 SETTING flip-flop 5. The consequent positive transition at the "1" output terminal of flip-flop 5 is applied to the pulsing leads of gates 17 and 18. However, gates 17 and 18 are disabled at this time, blocking the feedback pulse and thus precluding the increase in the binary count. Concurrently therewith the positive transition at the "1" output terminal of flip-flop 5 is applied to the pulsing lead of gate 38. The enabling lead of gate 38 is connected to the output of AND gate 41. One input to AND gate 41 is extended to the "0" output terminal of F flip-flop 21, and since this flip-flop is in the CLEARED condition, a high condition is applied to this input of gate 41. The other two inputs to gate 40 are connected to the "0" output terminal of flip-flop 6, and the "0" output terminal of flip-flop 8. Since flip-flops 6 and 8 are in the CLEAR condition when binary counter 1 advances to the binary count of 40, all of the inputs to AND gate 41 are in the high condition and gate 41 enables gate 38. Gate 38 therefore passes the transition from the "1" output terminal of flip-flop 5 to the clear input of S flip-flop 20 CLEARING this latter flip-flop and thus restoring flip-flops 20 and 21 to the initial CLEAR condition and returning feedback gates 15 through 18 to their normal conditions. The cycle, however, has been retarded 2 counts, as previously described, requiring 102 clock pulses to complete the count cycle. Thus the output timing signal from counter 1 is delayed by a greater degree to bring it into synchronism with the received data signal.

In the event that a mark to space transition occurs between clock pulse 24 and clock pulse 38 S flip-flop 20 and F flip-flop 21 will be SET enabling pulser gates 16, 18 and 19 and disabling pulser gates 15 and 17 as previously described.

Upon the occurrence of the twenty-ninth clock pulse, binary counter 1 advances to the binary count of 36 SETTING flip-flop 4. The "1" output terminal of flip-flop 4 applies a positive transition through pulser gate 16, thus increasing the count of binary counter 1 in the normal manner.

Upon the occurrence of the thirty-second clock pulse, binary counter 1 advances to the binary count of 40 SETTING flip-flop 5. With pulser gate 18 enabled, the feedback pulse from the "1" output terminal of flip-flop 5 is applied therethrough to the SET input of flip-flop 2 thereby increasing the count in the same manner as the normal cycling condition wherein gate 17 is enabled.

Upon the occurrence of the thirty-fifth clock pulse, binary counter 1 advances to the binary count of 44 SETTING flip-flop 4. Accordingly, a feedback pulse is applied through gate 16 in the previously described manner.

When the thirty-eighth clock pulse is applied to binary counter 1, advancing the counter to the binary count of 48, flip-flop 6 is SET, providing a feedback pulse through gate 19 and correspondingly advancing the counter in the normal manner as previously described. In addition, upon binary counter 1 advancing to the binary count of 48, flip-flop 5 CLEARS and the "0" output terminal thereof applies a positive transition to gate 35. Since the enabling lead to gate 35 extends to the "0" output terminal of flip-flop 8, gate 35 is enabled as previously described, thus passing the positive transition applied to the pulsing lead to the CLEAR input of F flip-flop 21. Accordingly, F flip-flop 21 CLEARS and with S flip-flop SET, gates 15 through 18 are disabled as previously described.

Upon the occurrence of the forty-first clock pulse, binary counter 1 advances to the binary count of 52 SETTING flip-flop 4. The positive transistion at the "1" output terminal of flip-flop 4 is not fed back at this time, however, because gate 16 is disabled. The feedback pulse is thus blocked, precluding the normal increase in the binary count.

Upon the application of clock pulse 45, binary counter 1 advances to the binary count or 56 SETTING flip-flop 5. The consequent positive transition at the "1" output terminal of flip-flop 5 is applied to the pulsing leads of gates 17 and 18. Gates 17 and 18 are disabled at this time, however, blocking the feedback pulse and thus precluding the increase in the binary count.

Upon the application of clock pulse forty-nine, binary counter 1 advances to the binary count of 60 SETTING flip-flop 4. The positive transition at the "1" output terminal of flip-flop 4 is not fed back, however, since gate 16 is disabled. Accordingly, the normal increase in the binary count is precluded. Concurrently therewith the positive transition at the "1" output terminal of flip-flop 4 is applied to the pulsing lead of gate 37. The enabling lead of gate 37 is connected to the output of AND gate 40. One input to AND gate 40 is extended to the "0" output terminal of F flip-flop 21 and since this flip-flop is in the CLEARED condition, a high condition is applied to this input of gate 40. The other three inputs to gate 40 are connected to the "1" output terminal of flip-flop 5, the "1" output terminal of flip-flop 6 and the "1" output terminal of flip-flop 7. Since flip-flops 5, 6 and 7 are in the SET condition when binary counter 1 advances to the binary count of 60, all the inputs to gate 40 are in the high condition and gate 40 in turn enables gate 37. Accordingly, the positive transistion at the "1" output terminal of flip-flop 4 is passed through gate 37 to the clear input of S flip-flop 20 CLEARING this latter flip-flop and thus restoring flip-flops 20 and 21 to the initial CLEAR condition and returning feedback gates 15 through 18 to their normal conditions. The count cycle, however, has been retarded three counts as previously described requiring 103 clock pulses to complete the clock cycle.

If the mark to space transition occurs between clock pulse 38 and clock pulse 50, S flip-flop 20 and F flip-flop 21 are SET enabling pulser gates 16, 18 and 19 and disabling pulser gates 15 and 17, as previously described. With gates 16, 18 and 19 enabled, binary counter 1 advances in the normal manner until the occurrence of clock pulse 50. This advances binary counter 1 to the binary count of 64 whereupon flip-flop 5 is CLEARED. The CLEARING of flip-flop 5 provides a positive transition from the "0" output terminal thereof to the pulsing lead of gate 35. Since the enabling lead of gate 35 is connected to the "0" output terminal of flip-flop 8, and flip-flop 8 had previously been in the CLEARED condition, gate 35 is enabled to pass the transition from flip-flop 5 to the clear input of F flip-flop 21. Accordingly, F flip-flop 21 CLEARS and with S flip-flop 20 SET, gates 15 through 18 are disabled, as previously described.

Upon the occurrence of the fifty-fourth clock pulse, binary counter 1 advances to the binary count of 68 whereupon flip-flop 4 is SET. The positive transition of the "1" output terminal of flip-flop 4 is not fed back at this time, however, because gate 16 is disabled. Accordingly, the normal increase in the binary count is precluded. Similarly, when binary counter 1 advances to the binary count of 72 SETTING flip-flop 5, the positive transition at the "1" output terminal thereof is not fed back because gates 17 and 18 are disabled. In the same manner when binary counter 1 advances to the binary count of 76 wherein flip-flop 4 is SET, the feedback pulse is blocked since gate 16 is disabled.

When binary counter 1 advances to the binary count of 84, flip-flop 4 is again SET and the positive transition at the "1" output terminal thereof is again blocked. At the same time the positive transition at the "1" output terminal of flip-flop 4 is applied to the pulsing lead of gate 39.

The enabling lead of gate 39 extends to the output lead of AND gate 42. One input to gate 42 is connected to the "0" output terminal of F flip-flop 21 and since this flip-flop is CLEARED, this input to gate 42 is in the positive condition. The other three inputs to gate 42 extend to the "0" output terminal of flip-flop 5, the "1" output terminal of flip-flop 6 and the "0" output terminal of flip-flop 7. These terminals are also in the positive condition when binary counter 1 advances to the binary count of 84.

Since all of the inputs to gate 42 are positive, gate 42 in turn enables pulser gate 39. Accordingly, pulser gate 39 passes the positive transition provided at the "1" output terminal of flip-flop 4 to the clear input of S flip-flop 20 CLEARING this latter flip-flop and thus restoring flip-flops 20 and 21 to the initial CLEAR conditions and returning feedback gates 15 through 18 to their normal conditions. The count cycle, however, has been retarded four counts as previously described requiring 104 clock pulses to complete the clock cycle.

Reviewing the effects of the reception of a mark to space transition occurring after the fourth clock pulse but prior to the fiftieth clock pulse of the count cycle, it is noted that S flip-flop 20 and F flip-flop 21 are both SET followed by the CLEARING of F flip-flop 21. Thereafter normal increases in the binary count of binary counter 1 are precluded to retard the count cycle. The number of instances that the increased count is blocked depends upon how late after initiation of the count cycle the mark to space transition occurs. Accordingly, the cycle is retarded and the timing signal pulse provided at the output of counter 1 is delayed. The amount of delay depends upon how late the mark to space transition is with respect to the initiation of the count cycle.

Assume now that the mark to space transition occurs after the fiftieth clock pulse. This may occur if the phase of the locally generated timing pulse at the output of counter 1 lags the phase of the incoming data signal. It is recalled that OR gate 30 continues to enable pulser gate 28, but after the fiftieth clock pulse AND gate 31 moves the enabling potential from pulser gate 27. Accordingly, a mark to space transition received after the fiftieth clock pulse is blocked by gate 27 but passed by gate 28 whereby only F flip-flop 21 is SET. As previously described, with F flip-flop 21 SET and S flip-flop 20 CLEAR, gates 15, 17 and 19 are enabled and gates 17 and 18 are disabled.

In the event that F flip-flop 21 is SET and S flip-flop 20 is CLEARED when the binary counter advances to the binary count of 72, the positive transition at the "1" output terminal of flip-flop 5 is not fed back to flip-flop 2 since gates 17 and 18 are disabled. Accordingly, the normal advance of one count is precluded. This positive transition, however, is also applied to the pulsing lead of gate 15. Since gate 15 is enabled, as previously described, the pulse is fed back to the set input of flip-flop 3. This results in the SETTING of flip-flop 3 and therefore the consequent advance of the binary count by two counts. Since the normal one count increase has been precluded and a two count increase has been substituted therefor, the binary count is increased by one. Accordingly, the cycle is advanced one count requiring one less clock pulse to complete the cycle. In the same manner the binary count is increased by one when binary counter 1 advances to the binary counts of 88, 104 and 120. Therefore, assuming that the mark to space transition occurs after the fiftieth clock pulse but before the fifty-seventh clock pulse wherein the binary count of binary counter 1 has not yet advanced to the binary count of 72, it is seen that there are provided four increases in the binary count thus advancing the cycle four counts and therefore requiring only 96 clock pulses to complete a full cycle. In this manner the phase of the timing signal from the output of counter 1 is advanced by four increments. This is a coarse adjustment in the relative phase of the locally generated timing signal.

In the event that the mark to space transition occurs after the fifty-seventh clock pulse, the first increase in the binary count does not occur until the sixty-ninth clock pulse when binary counter 1 advances to the binary count of 88. Accordingly, the cycle will be advanced three counts. Similarly, if the mark to space transition occurs between clock pulse 69 and clock pulse 82, the cycle will be advanced only two counts wherein 98 clock pulses are required to complete a cycle. In the same manner if the transition occurs after the eighty-second clock pulse but prior to the ninety-fourth clock pulse, only one increase in the binary count occurs, requiring ninety-nine clock pulses to complete a cycle.

In the event that the mark to space transition occurs after the ninety-fourth clock pulse, F flip-flop 21 is SET, as previously described. The advance of the binary counter 1, however, proceeds in the normal manner since the next subsequent feedback pulse, when clock pulse 97 is applied, is passed via gate 19. In any event, upon the occurrence of the one hundredth clock pulse, flip-flop 8 is CLEARED, and the positive transition at the "0" output terminal thereof is passed to the pulsing lead of gate 36. Since the enabling lead of gate 36 is connected to positive battery, the gate is normally enabled and therefore passes the pulse to the clear input of F flip-flop 21. Thus, when binary counter 1 advances to the binary count of 128 wherein the binary count is reset to 0, F flip-flop 21 is CLEARED restoring the flip-flops and the feedback gates to their normal conditions.

Summarizing the operation of this circuit when the mark to space transition is received after the fiftieth clock pulse, it is noted that F flip-flop 21 is SET and the cycle is thus advanced one count as binary counter 1 advances to each of binary counts 72, 88, 104, and 120. Accordingly, the number of clock pulses to complete a cycle is reduced and the timing signal is correspondingly advanced when the mark to space transition is received in the last half of the cycle. The amount of the advance of the timing signal is arranged to be varied in accordance with how many clock pulse counts prior to the termination of the cycle the mark to space transition is received.

Although a specific embodiment of this invention has been shown and described, it will be understood that various modifications may be made without departing from the spirit of this invention and within the scope of the appended claims.

What is claimed is:

1. A circuit for synchronizing a timing signal generator with incoming data signals comprising, a counter for providing said timing signal during each cycle of said counter, a clock circuit for advancing said counter, a plurality of counter feedback paths operable during each of said cycles upon said counter attaining predetermined different counts for additionally advancing the count of said counter, and means responsive to the reception of data signals during selected portions of said cycle of said counter for controlling said feedback paths in accordance with the selected portions within which the signals are received.

2. A circuit for synchronizing a timing signal generator with incoming data signals in accordance with claim 1 wherein each of said feedback paths operates upon said counter attaining a plurality of counts to advance said count a corresponding plurality of times each counter cycle.

3. A circuit for synchronizing a timing signal generator with incoming data signals in accordance with claim 1 wherein at least one of said feedback paths operates to advance said count in response to said counter attaining said predetermined count by an increment having a weight greater than the incremented weight of the advance of said count provided by others of said feedback paths.

4. A circuit for synchronizing a timing signal generator with incoming data signals in accordance with claim 3 wherein said one feedback path operates to advance said count a plurality of times for each counter cycle whereby the count is additionally increased by a count equal to a multiple of said plurality of times and said weight increment provided by said one feedback path.

5. A circuit for synchronizing a timing signal generator with incoming data signals in accordance with claim 1 wherein at least one of said feedback paths is normally enabled, said controlling means including means for disabling said one feedback path.

6. A circuit for synchronizing a timing signal generator with incoming data signals in accordance with claim 5 wherein said controlling means is arranged to disable said one feedback path in response to the reception of data signals during one of said selected cycle portions.

7. A circuit for synchronizing a timing signal generator with incoming data signals in accordance with claim 6 wherein another one of said feedback paths is normally disabled, said controlling means including means responsive to the reception of data signals during another one of said selected cycle portions for enabling said another one feedback path.

8. A circuit for synchronizing a timing signal generator with incoming data signals comprising, a counter for providing said timing signal during each cycle of said counter, a clock circuit for advancing said counter, registering means for registering the reception of data signals during a selected portion of said counter cycle, means responsive to said advance of said counter during each of said cycles to each of a plurality of successive counts for modifying said count of said counter, and means responsive to said registration for controlling said modifying means for the plurality of counts in the remainder of said cycle.

9. A circuit for synchronizing a timing signal generator with incoming data signals in accordance with claim 8 wherein said modifying means operate to advance said count.

10. A circuit for synchronizing a timing signal generator with incoming data signals in accordance with claim 9 wherein said modifying means is normally enabled, said controlling means including means for disabling said modifying means whereby the advance of said count provided by said modifying means is precluded.

11. A circuit for synchronizing a timing signal generator with incoming data signals in accordance with claim 9 wherein said counter restores said registering means on a predetermined count within said remainder of said cycle whereby the extent that the advance of said count is modified depends on the number of said plurality of successive counts occurring in the remainder of said cycle prior to said predetermined count.

12. A circuit for synchronizing a timing signal generator with incoming data signals in accordance with claim 9 wherein said modifying means is normally disabled, said controlling means including means for enabling said modifying means to increase the advance of said count.

References Cited

UNITED STATES PATENTS

| | | | |
|---|---|---|---|
| 3,069,568 | 12/1962 | Day | 307—269 XR |
| 3,185,963 | 5/1965 | Peterson et al. | 307—269 XR |
| 3,363,183 | 1/1968 | Bowling et al. | 328—72 XR |

ARTHUR GAUSS, *Primary Examiner.*

JOHN ZAZWORSKY, *Assistant Examiner.*

U.S. Cl. X.R.

178—69.5; 328—72, 155